United States Patent [19]

Göring et al.

[11] 4,442,497
[45] Apr. 10, 1984

[54] MEASURING SYSTEM FOR ALIGNMENT AND MEASUREMENT WITH AN ELECTRONIC TACHYMETER

[75] Inventors: Hermann Göring, Jena; Peter Hentschel; Wolfgang Meyl, both of Dresden, all of German Democratic Rep.

[73] Assignee: Jenoptik Jena GmbH, Jena, German Democratic Rep.

[21] Appl. No.: 267,831

[22] Filed: May 28, 1981

Related U.S. Application Data

[63] Continuation-in-part of Ser. No. 69,944, Aug. 27, 1979, Pat. No. 4,321,683.

[30] Foreign Application Priority Data

May 25, 1978 [DD] German Democratic Rep. ... 205575

[51] Int. Cl.³ .......................... G01C 3/08; G01B 11/26
[52] U.S. Cl. ........................................ 364/561; 356/5
[58] Field of Search ................ 364/561, 562; 356/4, 356/5, 141, 142; 340/870.19

[56] References Cited

U.S. PATENT DOCUMENTS

| | | | |
|---|---|---|---|
| 3,742,473 | 6/1973 | Hadden | 340/870.19 X |
| 4,113,381 | 9/1978 | Epstein | 364/561 X |
| 4,119,948 | 10/1978 | Ward et al. | 340/870.19 X |
| 4,171,907 | 10/1979 | Hill et al. | 356/5 |
| 4,205,385 | 5/1980 | Erickson et al. | 356/5 X |
| 4,321,683 | 3/1982 | Goring et al. | 364/561 |
| 4,346,989 | 8/1982 | Gort et al. | 356/5 |

Primary Examiner—Edward J. Wise
Attorney, Agent, or Firm—Jordan and Hamburg

[57] ABSTRACT

A system for alignment and measurement of positions includes an electronic tachymeter and a reflector system. A processing system calculates the difference, in given coordinates, between the position of the reflector system and a position of known coordinates, and this data is transmitted to the reflector system. The reflector system includes a display for displaying this difference, enabling an operator at the reflector system to adjust the position of a reflector system tube to the known position.

5 Claims, 3 Drawing Figures

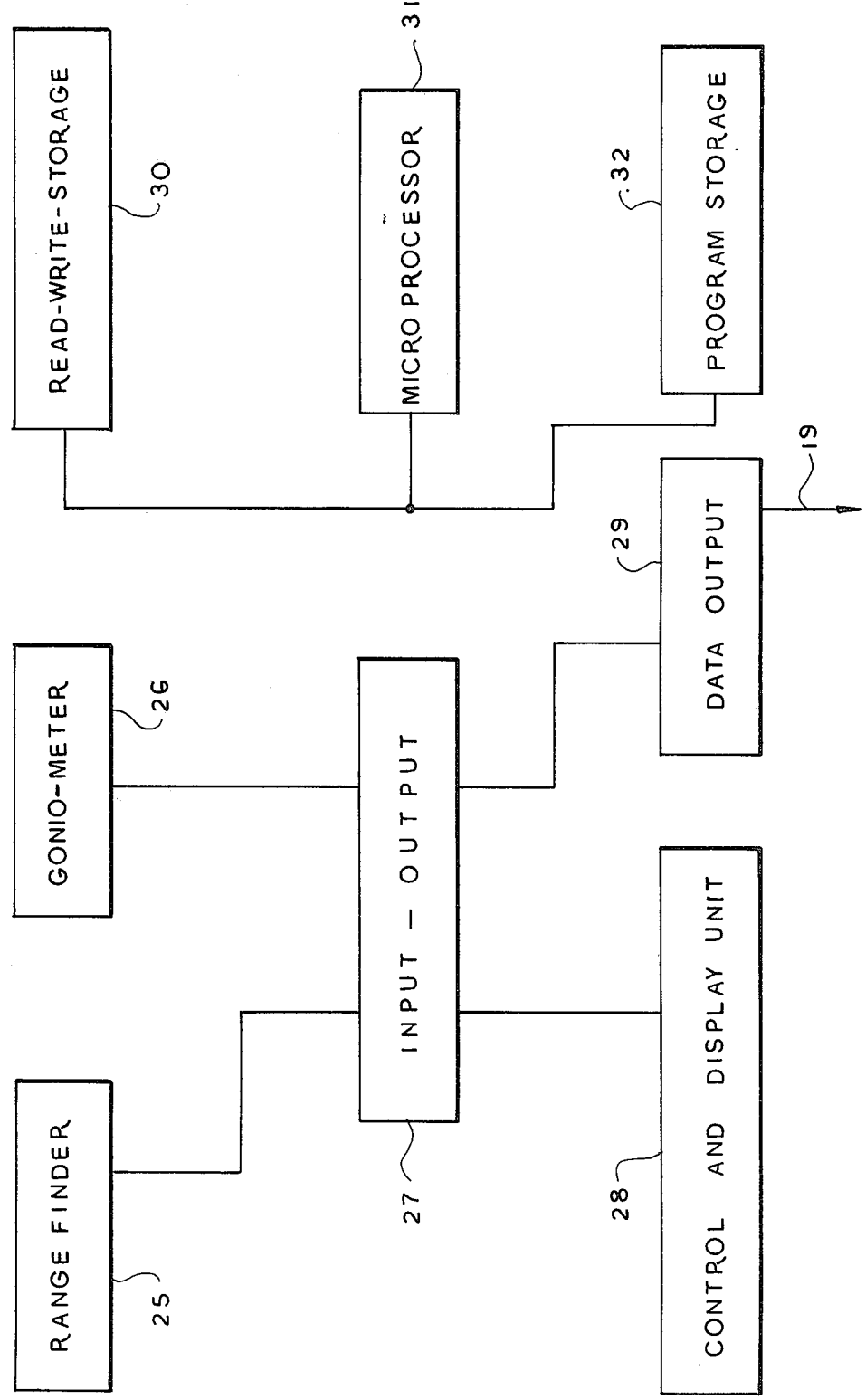

MEASURING SYSTEM FOR ALIGNMENT AND MEASUREMENT WITH AN ELECTRONIC TACHYMETER

REFERENCE TO RELATED APPLICATIONS

This is a continuation-in-part application of Ser. No. 69,944, filed Aug. 27, 1979, now U.S. Pat. No. 4,321,683.

BACKGROUND OF THE INVENTION

This invention relates to a measurement system for the alignment and measurement of positions with a tachymeter when the geodetic coordinates of these positions are known.

Beginning at a known position, the coordinates of this position are transposed to the terrain as orthogonal coordinates (x,y, or $\Delta x$, $\Delta y$ respectively) or as polar coordinates ($a$,e) and the individual point is located in the terrain. Here the optical training on the known position is effected by the measuring assistant with the use of visual or oral signals. At large distances or in noisy locations, radio may be used for better communication. It is also feasible to process this measurement by means of a tachymeter at the location to be aligned. It is very difficult in this case to direct the measuring assistant, since the result of the measurement at the location of the tachymeter cannot be recognized at the location of the reflector, and even an experienced measuring assistant might make some motions between the order from the known location and the conscious execution thereof. This has a deleterious influence upon the exact locating of the individual positions.

The invention is therefore directed to the exact determination of the deviation of an aligned or measured location from its desired position, and to the provision of means for making this deviation immediately visible to the measuring assistant. The invention is also directed to improving communication between the point having a known position, and the point to be aligned, as well as the improvement of accuracy of measurement and alignment and simultaneously a decrease of time spent for these activities. The invention is also directed to assuring the communication of the deviation to the measuring assistant under all circumstances.

Briefly stated, according to the invention, an electronic tachymeter is positioned at the known location. The tachymeter transmits electromagnetic radiation to a reflector adapted to be trained upon the point to be aligned. Radiation reflected from the reflector is received and employed for the determination of distance and direction. The tachymeter system incorporates a calculator, a modulator and a transmitter; the reflector system incorporates a receiver, a demodulator (pulse integrator), an evaluating and storage unit and a display unit. The computer may be a component of the electronic tachymeter. It calculates the differences of the coordinates ($\Delta x$, $\Delta y$, or $a$,e respectively) which indicate how far the reflector must be moved, in order to locate it at the position of alignment according to known formulae. The computer may be capable, of course, of executing additional calculating operations, needed for the distance and direction processes, but which are not necessary for this invention.

The modulator is usually not identical with modulators conventionally used for distance measurements. The modulator serves to convert the digital signals received from the computer into a transmittable analog mode. Modulation may be executed according to amplitude, frequency, phase or any other known method of modulation.

The transmitter is of conventional construction. According to one very simple embodiment, it is comprised of a loudspeaker and a hand-held transceiver, whose loudspeaker is coupled to the first mentioned loudspeaker. The transceiver transmits radio signals corresponding to the output signals of the modulator.

The receiver at the reflector may, in its simplest embodiment, also consist again of a hand-held transceiver having its loudspeaker coupled to a microphone. Both transceivers serve to receive or transmit acoustic signals of different frequency and to convert them to or from radio signals, respectively.

The demodulator digitalizes the signals received by the receiver and transmits them to an evaluating and storage unit, which prepares the signals for the display and transmits them to the display unit.

The computer, modulator and transmitter may also be combined in one computing and transmitting unit and may be located at an evaluating station, separated from both the tachymeter and reflector.

The computer may be a component of the tachymeter, and may consist of a central processing unit, a temporary storage, a receiving and transmitting unit, and a program storage.

In order that the invention will be more clearly understood, it will now be disclosed with regard to the accompanying drawing, wherein:

FIG. 3 is a block diagram of the automatic tachymeter.

Figures 1, 2:
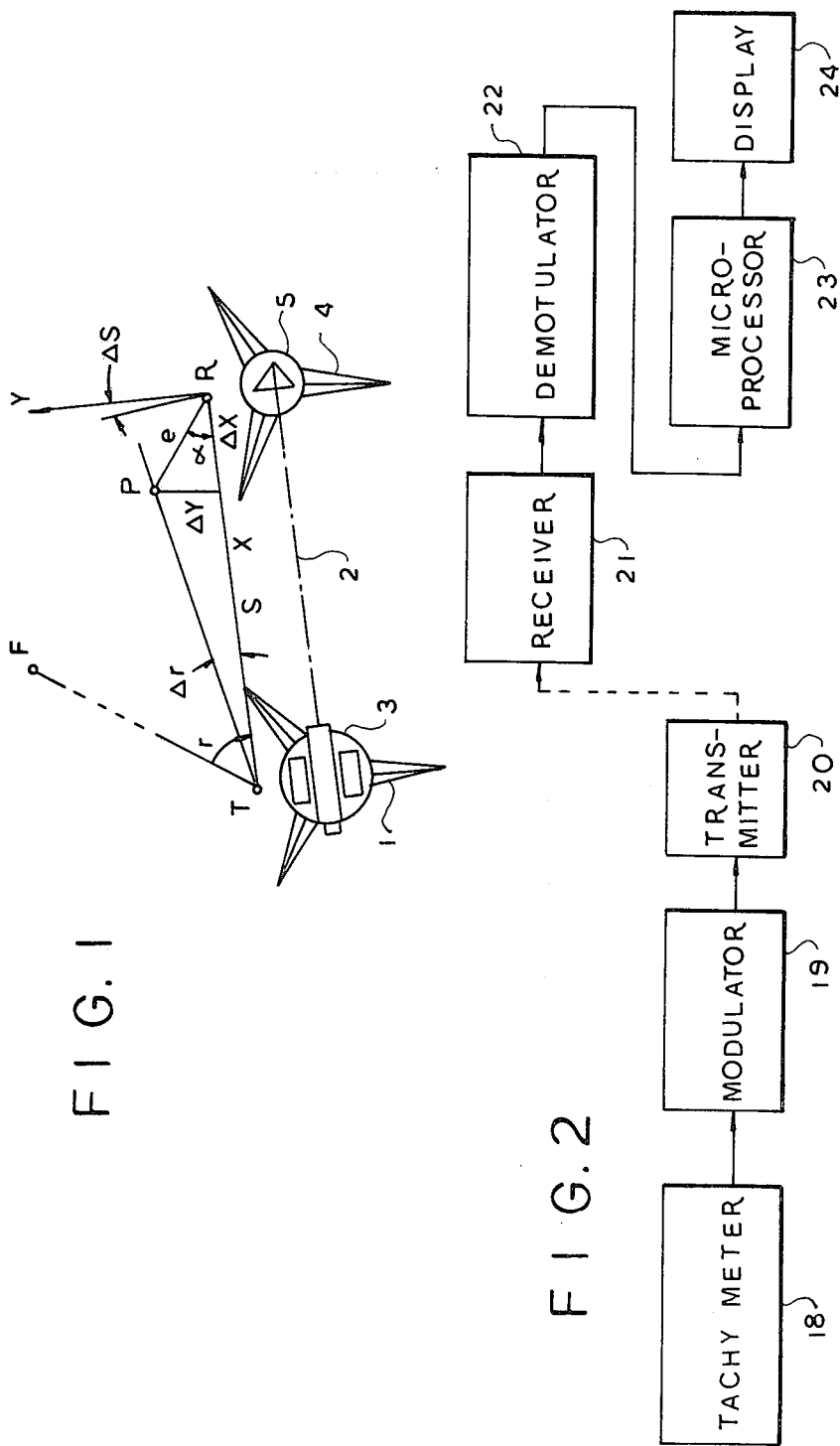
FIG. 1 is a plot of a plurality of points, illustrating the principle of the invention.
FIG. 2 is a block diagram of a measuring arrangement according to the invention, using an automatic tachymeter.

In FIG. 1 the point T represents the position of an electronic tachymeter, F is a fixed point, R is the position of the reflector, P is the desired position of the point to be aligned, x and y are the coordinate axes of a topological coordinate system with its origin at R, $\Delta x$ and $\Delta y$ the orthogonal coordinate differences between P and R, $a$ and e are the polar coordinate differences between P and R, and r is the direction, s the distance between point T and point R.

A tachymeter 3, shown for the sake of clarity beside point T and mounted upon a tripod 1 with its line of collimation parallel to line s, as known for example from DE-OS 2750933, is positioned at point T. It is first trained upon the fixed point F and then upon reflector 5. The reflector 5 is located at point R, and is shown for the sake of clarity beside R, and is mounted upon a tripod 4. In use, the tachymeter 3 automatically determines direction r and length s and derives therefrom the coordinates of point R, according to conventional calculations. The electronic tachymeter 3 also stores the coordinates of point P so that it can compare the coordinates of point R with those of point P and derive the difference coordinates $\Delta x$, $\Delta y$. These differences are transmitted to the reflector position R and are displayed at position R, for example by the assistant. The reflector is moved taking into account the difference coordinates $\Delta x$, $\Delta y$ displayed in the reflector. The measurement of the direction r and the distance s may be repeated if so desired, and the reflector adjusted, as above, until difference coordinates, calculated at the tachymeter 3 and displayed at reflector 5 become 0. R and P now coincide, the reflector is disposed at the position P to be aligned and this position may be marked in the terrain. This process is repeated for each position, since there are usually a plurality of points to be measured and aligned. The tachymeter 3 is capable at calculating and displaying the polar coordinates $\alpha,e$ or the differences of direction and distance on reflector 5, in addition to, or instead of the rectangular coordinate differences $\Delta x$, $\Delta y$. In accordance with the invention, a measuring assistant at reflector 5, who controls the reflector, no longer requires the not always ambiguous or not always easily accomplished optical acoustical sign language from an operator located at tachymeter 3 for erecting the reflector at a point of terrain to be marked. The assistant merely adjusts the reflector to the desired point P, using the signal of display means at the reflector 5. It is thus only required that the operator let the tachymeter measure repeatedly the location of the reflector 5, so that the measuring assistant may repeatedly correct and control his position with the aid of the display.

It is, of course, also possible to correct the height position z of the reflector displaying a difference by $\Delta z$, when the altitude is of importance. The altitude angle $\beta$ may also be measured and corrected by the electronic tachymeter in the above disclosed manner.

FIG. 2 shows an automatic electronic tachymeter 18 which will be disclosed in greater detail with reference to FIG. 3. The output of the tachymeter is modulated in modulator 19, and transmitted by a transmitter 20. The tachymeter 18 transmits data output, comprising the signals of the measuring and calculating results, as well as the identification of the point, to the modulator 19. The modulator modulates these digital signals for transmission and transmits them as analog signals to the transmitter 20, and also regulates this transmitter. At the location of the reflector (FIG. 1) a receiver 21 is positioned to receive the signals sent by transmitter 20, and a demodulator (pulse integrator) 22 is connected to the receiver 21. The demodulator 22 transforms the high frequency signals received to low frequency signals, and prepares them for an evaluating and storage unit (microcomputer, digital circuit) 23. The evaluating and storage unit 23 processes the received low frequency signals according to a predetermined program, and controls a display unit 24.

The automatic tachymeter 18 comprises, as shown in FIG. 3, a distance measuring device 25, an angle measuring device 26 and a microcomputer, encompassing an input-output unit 27, a control and display unit 28, a data output 29, a read and write storage 30, a central processing unit 31 and a program storage 32. Data acquired by the automatic tachymeter by the use of the distance measuring device 25 or angle measuring device 26, respectively, are applied by way of the input-output unit 27 for storage in the read and write storage 30 and are processed by microprocessor 32 according to a program stored in the program storage 32, along with the data entered into the read and write storage 30 by way of the control and display unit 28 as well as the input-output unit 27 before or after making the measurement. The data is then applied to the data output 29 by way of the input-output unit 27, according to an output program, and is also stored in the program storage 32. The output may, for instance, be in the form of pulse duration modulation. The data output 29 controls the modulator 10 which in turn modulates the transmitter 20.

What is claimed is:

1. A measuring device for aligning and measuring points in a terrain, comprising an electronic tachymeter system and a reflector system, said tachymeter system comprising range finding means for providing output signals corresponding to the position of the reflector system, in a given coordinate system, computer means for calculating the difference between the position of said reflector system and a second position of known coordinates, and electromagnetic energy transmitting means for transmitting signals corresponding to said difference to said reflector system, said reflector system comprising receiving means for receiving said signals, and display means for visually displaying said difference, in response to said signals.

2. The measuring device of claim 1 wherein said tachymeter comprises means for sending a beam of electromagnetic rays to said reflector system, and to receive such beam after reflection, for determining the position of said reflector system.

3. The measuring device of claim 1 wherein said computer means comprises means for storing data corresponding to at least one position of known coordinates, means for comparing said known coordinates with said output signals corresponding to the position of the reflector system and for computing the difference therebetween to provide digital difference values, said transmitting means comprising a modulator connected to transform said digital difference values to analog difference values, and a transmitter coupled to transmit said analog difference values.

4. The measuring device of claim 3 wherein said reflector system comprises means for receiving said transmitted signals, the modulator means for converting said received signals to digital form, and means for processing the modulated signals for application to said display means.

5. The measuring device of claim 4 wherein said computer means and range finding means form a single unit, said computer means including a central processing unit, a temporary storage coupled thereto for storing received data, an input-output means for coupling said processing unit to said range finding means and transmitting means, and program storage means for controlling the program of said computing means.

* * * * *